June 1, 1948.    J. A. HILL    2,442,689
MACHINE FOR ASSORTING EGGS ACCORDING TO WEIGHT
Filed Sept. 29, 1943    3 Sheets-Sheet 1
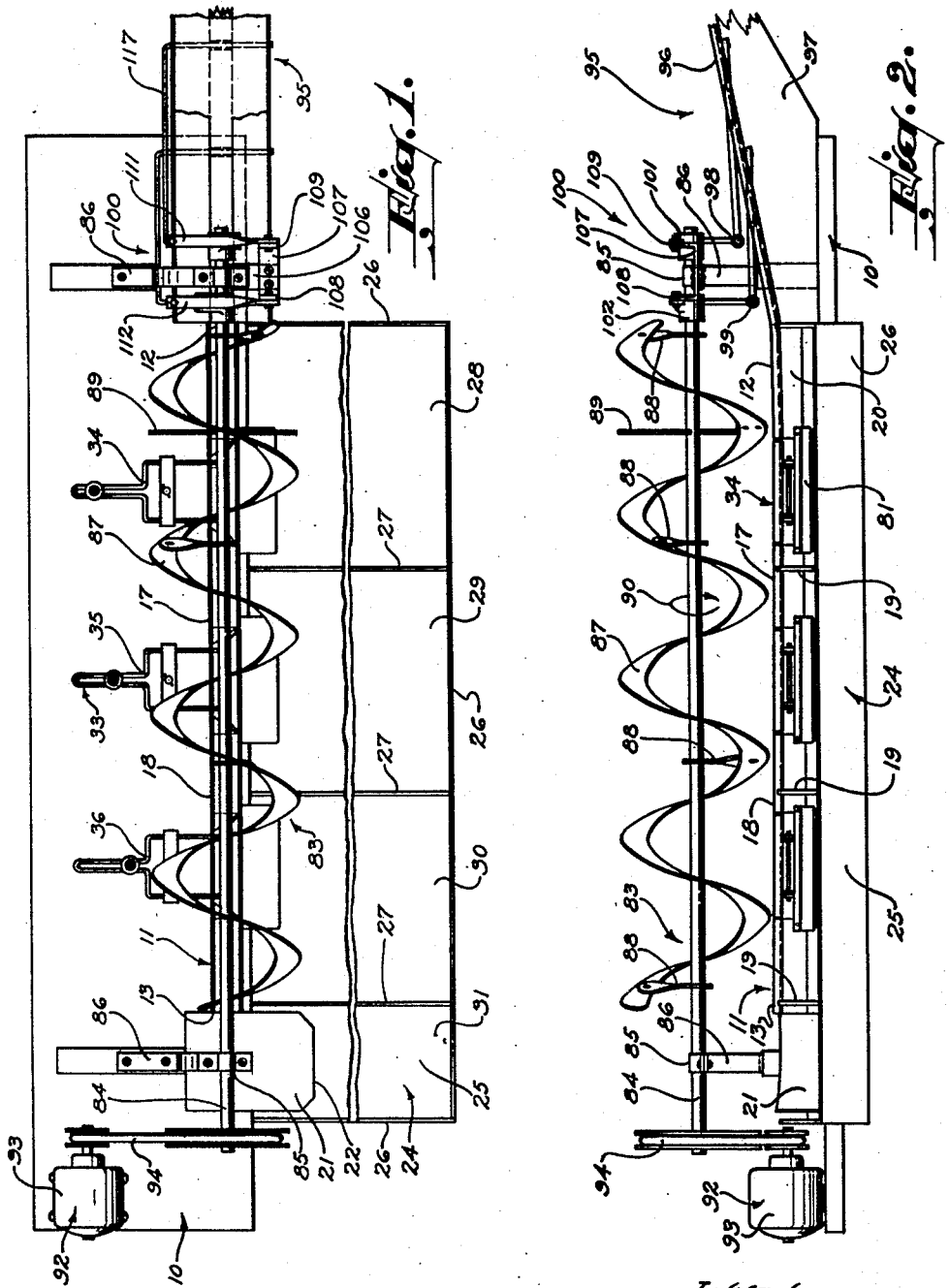
INVENTOR
JOSHUA A. HILL
BY HARRIS, KIECH, FOSTER & HARRIS
FOR THE FIRM
ATTORNEYS June 1, 1948. J. A. HILL 2,442,689
MACHINE FOR ASSORTING EGGS ACCORDING TO WEIGHT
Filed Sept. 29, 1943 3 Sheets-Sheet 2
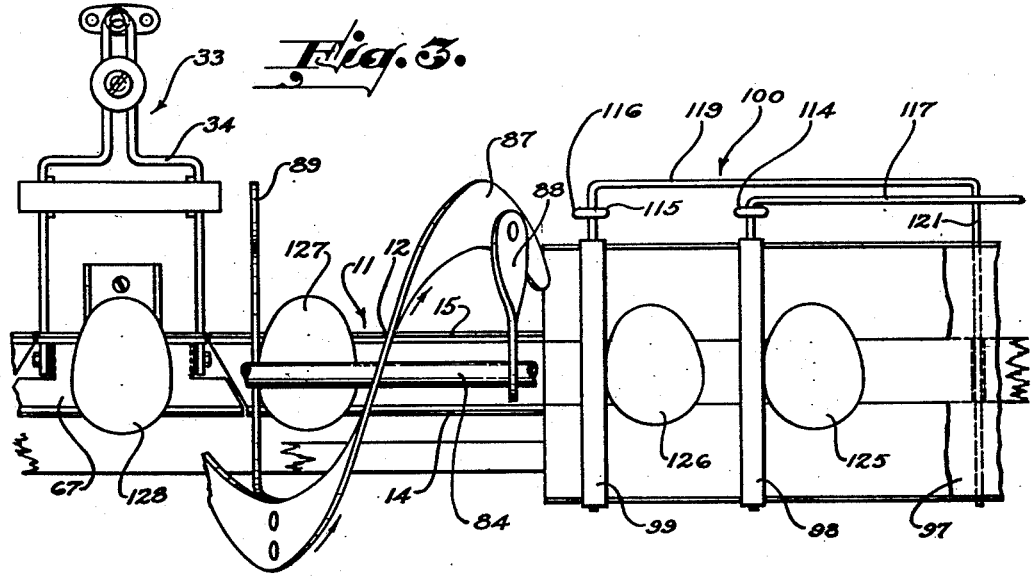
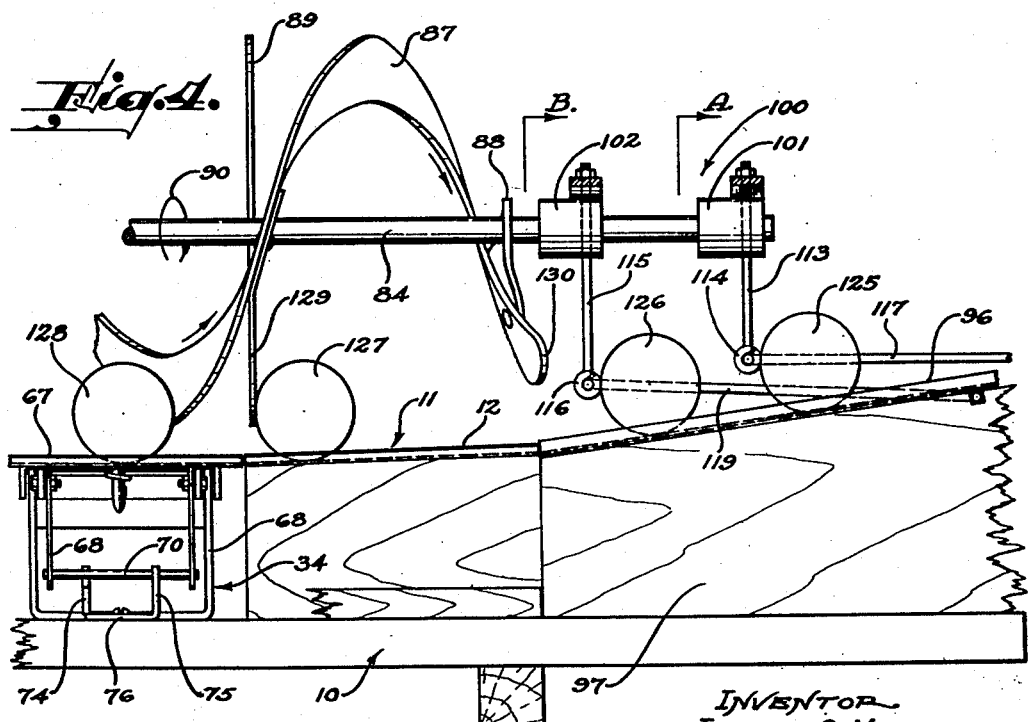
INVENTOR.
JOSHUA A. HILL
BY HARRIS, KIECH, FOSTER & HARRIS
ATTORNEYS June 1, 1948. J. A. HILL 2,442,689
MACHINE FOR ASSORTING EGGS ACCORDING TO WEIGHT
Filed Sept. 29, 1943 3 Sheets-Sheet 3
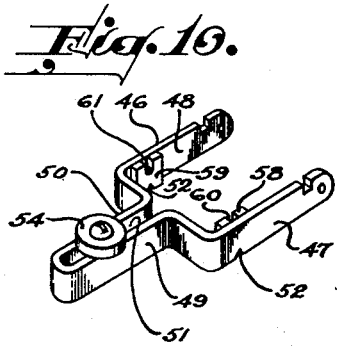
INVENTOR
JOSHUA A. HILL
BY
HARRIS, KIECH, FOSTER & HARRIS
ATTORNEYS Patented June 1, 1948

2,442,689

UNITED STATES PATENT OFFICE 2,442,689

MACHINE FOR ASSORTING EGGS ACCORDING TO WEIGHT

Joshua A. Hill, Canoga Park, Calif.

Application September 29, 1943, Serial No. 504,226

20 Claims. (Cl. 209—121)

My invention relates to the art of grading machinery, and more particularly to a machine adapted to grade ovate or spherical articles by weight.

My invention is of particular utility in the egg grading art and, consequently, will be described in connection therewith for illustrative purposes, although it will be understood that it has other uses and applications and that I do not intend to be limited to the particular embodiment described.

It is customary in the egg industry to grade eggs for market according to their weight, the usual grades sold being "large," "medium," and "small," depending upon their weight. Some overweight eggs are sold as "extra large," and some underweight eggs are sold as "peewees."

According to present almost universal practice, each egg is separately weighed on an individual scale by hand to determine its size grade for market, which is a laborious and time-consuming method of handling eggs, and very undesirable. Several types of automatic egg grading machines are on the market, but they are large, intricate, delicate machines which are so costly that the large majority of egg handlers are unable to purchase or operate them.

It is therefore a primary object of my invention to provide an egg grading machine which will simply and efficiently automatically grade by marketable weights a flow of eggs fed to it.

A further important object of the invention is to provide such a machine which is simple and cheap to construct and economical to operate, whereby it may be made available to those members of the public who are at present unable to purchase or use automatic egg grading machinery.

I prefer to accomplish the foregoing objects by providing a longitudinal track having a plurality of separate scales in the line of the track, each scale being adapted to remove from the track an egg of a predetermined minimum weight, and having mechanism for conveying a flow of eggs along the track and onto the scales in sequence until removed from the track by one of the scales, and this is a further object of my invention.

Another object of my invention is to provide a conveyor for an ovate or spherical object, including a longitudinal track on which the object is adapted to roll, and a continuous worm disposed over the track adapted in response to rotation to roll the object along the track.

Still another object of my invention is to provide an egg grading machine having such a track and such a conveyor as described above.

A further object of my invention is to provide a novel gate mechanism for feeding by gravity a sequence of objects at predetermined spaced intervals to a conveyor track.

Other objects and advantages of my invention will be apparent from the following description and the drawings, which are for illustrative purposes only, and in which:

Fig. 1 is a plan view of my invention.

Fig. 2 is a front elevational view of the machine shown in Fig. 1.

Fig. 3 is an enlarged fragmentary plan view of the feeding mechanism of my invention shown in Fig. 1.

Fig. 4 is an enlarged fragmentary elevational view of the feeding mechanism shown in Fig. 3.

Fig. 5 is an enlarged plan view, partially broken away, showing the details of one of the scales of my invention.

Fig. 6 is a sectional view taken on the line 6—6 of Fig. 5, and including part of the discharge apron.

Fig. 7 is a plan view of a baffle plate of the invention.

Figs. 8 and 9 are diagrammatic sectional views illustrating the cam actuating mechanism of the feeding mechanism shown in Figs. 3 and 4.

Fig. 10 is a perspective view of the balance arms of the scale shown in Figs. 5 and 6.

Fig. 11 is a perspective view of the supporting arms of the scale shown in Figs. 5 and 6.

Referring to Figs. 1 and 2 of the drawings, the general elements of a preferred embodiment of the invention are a supporting base 10, track means 11, scale means 33, conveyor means 83, power means 92, feeder means 95, gate means 100, and receiver means 24.

The supporting base 10 has suitably fixed thereon the track means 11, which has an inlet end 12 and a discharge end 13. As best shown in Figs. 3 and 4, the track means 11 is in the form of a shallow pan, providing upwardly projecting edges 14 and 15 which form the tracks of the track means. The track means 11 is formed of a plurality of longitudinally aligned segments including the inlet end 12, the discharge end 13, and intermediate segments 17 and 18, the segments and discharge end being suitably supported on the base 10, as by posts 19, and the inlet end 12 being supported on the supporting base by a solid wooden block 20. As best shown in Fig. 2, the supporting base 10 is disposed substantially horizontal, and relative to it the inlet end 12 of the track means 11 is inclined slightly downwardly from the inlet end thereof toward the discharge end of the track means. Also, as will be noted, the intermediate segments 17 and 18 and the discharge end 13 of the track means are slightly upwardly inclined from the inlet end toward the discharge end thereof, for a purpose to be described hereinafter.

At the discharge end of the track means 11 is disposed a transverse terminal discharge apron 21 which slopes downwardly from its point of registry with the discharge end 13 of the track means to its lower end 22 which rests on the receiver means 24. As will be noted from Fig. 2, the terminal discharge apron 21 is slightly concave in cross section on its upper surface to guide an egg or other object rolling downwardly thereon from the track means 11 into the receiver means 24, as will be described hereinafter.

The receiver means 24 in the form shown is a shallow box 25 having upwardly extending outer retaining walls 26, as best shown in Fig. 1, and being divided by vertical partitions 27 into a first receiving compartment 28, a second receiving compartment 29, a third receiving compartment 30, and a fourth receiving compartment 31 into which the terminal discharge apron 21 extends. The bottom and inner walls of the receiving compartments 28, 29, 30, and 31 are preferably lined with felt or other cushioning material 32 to provide a cushioning means for eggs discharged thereonto from the track means, as illustrated in Fig. 6.

As best shown in Figs. 1 and 2, the scale means 33 includes three identical scales 34, 35, and 36 disposed in the line of the track means 11. For example, the manner in which the scale 34 cooperates with the inlet end 12 and the intermediate segment 17 of the track means 11 is illustrated in Fig. 5. The scale 34, as best shown in Figs. 5 and 6, includes a supporting bracket 37 of substantially U-shape having a pair of vertical side members 38 and 39 and a flat bottom plate 40 extending therebetween, the bottom plate 40 being suitably secured to the supporting base 10, as by wood screws 41. Secured to the side members 38 and 39 and extending horizontally therebetween is a balance member 42 having an upwardly directed knife edge 43 which provides a main pivot point for the scale means 33. Rigidly secured to and extending upwardly from the center of the balance member 42 is a vertical stud 45, the upper end of which is threaded for a purpose to be described hereinafter.

Supported on the knife edge 43 of the balance member 42 is a balance arm 46 which is substantially Y-shaped, as illustrated in Fig. 5, having forward arms 47 and 48, the rear ends of which are bent inwardly to provide closely spaced rear arms 49 and 50 providing a relatively narrow slot 51 therebetween. A notch 52 is provided in the under side of each of the arms 47 and 48 into which the knife edge 43 enters, to retain the arms in position on the knife edge. A screw 53 extends through the slot 51 and through a washer-shaped counterbalance member 54 which is supported directly on the rear arms 49 and 50, the screw being held in place by a nut 55 on the lower end thereof. As will be apparent, by loosening the nut 55, the counterbalance 54 may be moved toward or away from the balance member 42 and secured in any desired position relative thereto. Also secured to the supporting base 10 is a stop post 56 which is vertically aligned with a connection 57 between the rear arms 49 and 50 when they are in substantially horizontal position, and which serves to limit clockwise rotation of the balance arm 46, as seen in Fig. 6.

Secured to the rear portions of the forward arms 47 and 48 are vertical plates 58 and 59, respectively, having vertical slots 60 and 61 therein, respectively, the upper ends of which are open. The slots 60 and 61 receive opposite ends of a wire 63 which is horizontally disposed and looped about the vertical stud 45, as best shown in Fig. 5. The function of the wire 63 is to retain the arms 47 and 48 against lateral movement relative to the side members 38 and 39, to center the balance arm 46. Spanning the side members 38 and 39 and seated on the upper ends thereof is a top plate 64 having downwardly extending engaging ears 65 at each end thereof which make a relatively tight sliding fit with the outer surfaces of the side members, the top plate also having a central opening through which the vertical stud 45 extends. A wing nut 66 is threaded onto the upper end of the vertical stud 45 to retain the top plate 64 in position on the side members 38 and 39.

Pivotally supported on the forward ends of the forward arms 47 and 48 is a scale track 67 which is adapted when in horizontal position to register in alignment with the inlet end 12 and the intermediate segment 17 of the track means 11. The scale track 67 has rigidly secured thereto a pair of downwardly extending track arms 68 which are spaced so that they will be disposed within the forward arms 47 and 48 of the balance arm 46. Extending through the upper ends of the track arms 68 and through the outer ends of the forward arms 47 and 48 of the balance arm 46 is a track pivot bar 69 which pivotally supports the scale track 67 on the balance arm 46. Secured to and extending between the track arms 68 is a round guide bar 70 having a roller sleeve 71 rotatable thereon which engages in guide slots 72 and 73 formed in guide plates 74 and 75, respectively, which extend upwardly from an integral bottom plate 76 suitably secured to the supporting base 10. As will be noted, each of the guide slots 72 and 73 has an upper vertical portion 77, a central semicircular portion 78, and a lower sloping portion 79. As will be evident from Fig. 6, the balance arm 46 is movable from the full line position illustrated in Fig. 6 to the position indicated therein by dotted lines 80, which latter position is the dumping position. When the scale track 67 is in the dumping position illustrated in Fig. 6, it extends downwardly and over a receiving apron 81 which is suitably fixed to the block 20 as best illustrated in Figs. 2 and 6. As will be noted, the receiving apron 81 slopes downwardly onto the upper surface of the first receiving compartment 28. As will also be noted, the scale track 67, when in its upper position, registers with and forms a part of the track means 11, so that an egg or other object may be rolled along the track means 11 and over the scale 34. As will be understood, the scales 35 and 36 are identical in all respects with the scale 34 and will not be separately described in detail, it being evident that the scale tracks of each scale register with and cooperate with the track means 11 to provide a continuous track from the inlet end 12 to the discharge end 13.

The conveyor means 83 includes a rotatable shaft 84 journaled in suitable bearings 85 supported by brackets 86 rigidly mounted on the supporting base 10. Supported on the rotatable shaft 84 is a spiral worm 87, supported by plates 88 secured to the shaft. As will be noted, the worm 87 is of substantial diameter and extends along the entire length of the track means 11, just clearing the upper face thereof. Over the inlet end 12 of the track means 11 a baffle 89 is secured to the spiral worm 87 and is disposed in a plane perpendicular to the track means 11. The baffle 89 is substantially semicircular in configuration, as best illustrated in Fig. 7. The shaft 84 is adapted to be rotated in the direction of the arrow 90 shown in Figs. 2 and 4 by the power means 92.

The power means 92 includes an electric motor 93 connected by a belt drive 94 with the shaft 84 of the conveyor means 83. The motor 93 is preferably a low speed motor and may include any desirable reduction gear system so as to provide a relatively slow rate of rotation of the shaft 84.

To feed eggs or other appropriate objects to be graded to the machine, the feeder means 95 is provided. The feeder means 95 includes a feeder track 96 supported by a block 97 on the supporting base 10 so as to slope downwardly and register at its lower end with the inlet end 12 of the track means 11. Ovate or spherical objects placed on the feeder track 96 will roll by gravity downwardly thereon onto the inlet end 12 of the track means 11.

Adapted to cooperate with the feeder track 96 is a pair of vertically movable horizontal gate members 98 and 99, which are included in the gate means 100 of the invention. The gate means 100 also includes a first cam member 101 and a second cam member 102, both of which are rigidly fixed to the shaft 84, as by press fitting or otherwise. The shape and relative positions of the cam members 101 and 102 are of considerable importance and are best illustrated in Figs. 8 and 9. The cam member 101 is cylindrical in form but is set on the shaft 84 eccentric to its axis so as to provide a high cam surface 103 on one side thereof. On the other hand, the cam member 102 is substantially cylindrical and is set on the shaft 84 concentric with the axis thereof, but is provided with a short, relatively steep cam surface 104 provided with a radial step 105 back to the semicircular outer surface of the cam member. As will be noted from Figs. 8 and 9, the high point 103 on the cam surface of the first cam member 101 is approximately 90° out of phase with the steep cam surface 104 on the second cam member 102. As best shown in Figs. 1 and 2, rigidly secured to the bracket 86 at the inlet end 12 is a bracket plate 106 to which in turn is rigidly secured a U-shaped supporting arm 107 having upwardly extending ears 108 and 109. Pivoted to the ear 109, as by a suitable pivot pin or otherwise, is a first cam lever 111 which rests on the first cam member 101. Similarly, pivoted to the ear 108, as by a suitable pivot pin or otherwise, is a second cam lever 112 which rests on the second cam member 102. As shown in Fig. 9, the first cam lever 111 is provided at its free end with a vertically depending rod 113, the lower end being provided with a circular eye 114. Similarly, as shown in Fig. 8, the second cam lever 112 is provided at its free end with a vertically depending rod 115, having at its lower end an eye 116. As illustrated in Figs. 1, 3, and 4, a U-shaped rod 117 passes through the eye 114 and is supported thereby, having supported thereon the gate member 98 which is preferably in the form of a cylindrical rod, the other end of the rod 117 being pivotally secured in the block 97, as illustrated in Fig. 1. Similarly, as shown in Figs. 3 and 4, a U-shaped rod 119 passes through the eye 116, the end adjacent the eye having fixed thereon the second gate member 99, the other end 121 of the rod 119 being pivotally secured in the block 97. As best illustrated in Figs. 8 and 9, the first cam lever 111 has a gradually sloping cam surface 123 thereon adapted to engage the cam surface 103 of the first cam member 101, and the second cam lever 112 has a steep cam surface 124 thereon adapted to engage the cam surface 104 of the second cam member 102.

Preliminary to operation, the counterbalance 54 of the scale 34 is adjusted, as previously described, so that a predetermined minimum weight on the scale track 67 will overbalance the counterbalance and cause the scale track to move downwardly to the dumping position illustrated in the dotted lines 80 of Fig. 6 to permit the scale to dump therefrom the egg or other object to be graded. Thus, the scale 34 may be adjusted so that it will move to dumping position only when an egg of predetermined large size is placed on the scale track 67 thereof, the scale 35 may be adjusted so that it will move to its dumping position only when an egg of intermediate size is placed on its scale track, and the scale 36 may be adjusted so that it will move to its dumping position only when a small egg of predetermined weight is placed on its scale track. With such a setting, obviously the counterbalances of each of the scales will be set at a different distance from the knife edge 43 of its balance member 42, as generally illustrated in Fig. 1.

In operation, the power means 92 rotates the shaft 84 and consequently the worm 87 at a relatively low rate of speed in the direction of the arrow 90 illustrated in Figs. 2 and 4. Ovoids, such as eggs, or spherical objects, are then placed on the feeder track 96, being fed thereto by hand or otherwise. If ovoids are to be graded, they are placed on the feeder track 96 so that their longitudinal axes are substantially normal to the length of the feeder track, as best illustrated in Fig. 3. Due to the inclined slope of the feeder track 96, the sequence of eggs placed thereon will roll by gravity down the track toward the inlet end 12 of the track means 11, this providing a gravity feed for the device. Other forms of feeding mechanism, obviously, may be substituted without departing from the spirit of my invention.

As diagrammatically illustrated in Figs. 3 and 4, an egg 125 is illustrated as resting against the first gate member 98, an egg 126 is illustrated as resting against the gate member 99, an egg 127 is illustrated as resting against the baffle 89, and an egg 128 is illustrated as being on the scale track 67 of the scale 34. Due to the slightly downwardly inclined upper surface of the inlet end 12 of the track means 11, the eggs will roll downwardly thereon until they engage and are stopped by the baffle 89. However, as soon as the eggs pass the baffle 89, they roll onto the scale 34 which, together with the remainder of the track means 11, is sloped slightly upwardly so that the eggs rest from that point on against the worm 87. Rotation of the worm 87 thus moves the eggs over the scale 34 and along the track means 11 to the discharge end 13 thereof. Obviously, a cylindrical object will be rolled along the track means 11 by the rotation of the worm 87 without any tendency to fall off the track means. The same thing is true of an ovoid which rolls along the track means 11 with its longitudinal axis at all times substantially perpendicular to the track, there being substantially no tendency for the ovoid to fall off the track means even though it is pushed steadily and continuously by the worm 87.

The function of the baffle 89 is to prevent more than one egg at a time from being on the scale track 67 of the scale 34. The baffle 89 is so designed and disposed that it holds the egg 127 from rolling onto the scale track 67 of the scale 34 until the egg 128 has been moved off the scale track 67 onto the intermediate segment 17, or until it has been dumped by the scale 34 into the receiving compartment 28 and the scale track 67 has returned to the position shown in Fig. 4. By the time the worm 87 has moved the egg 128 onto the intermediate segment 17, the open end 129 of the baffle 89 clears the egg 127, thus allowing it to roll onto the scale track 67 of the scale 34.

The gate members 98 and 99 are designed to feed eggs at spaced intervals onto the inlet end 12 of the track means 11, the intervals being spaced such that the inlet end 130 of the worm 87 will not hit the eggs as they roll from the second gate member 99 onto the inlet end 12 of the track means 11. Also, the second gate member 99 prevents the egg 126 from rolling onto the inlet end 12 of the track means 11 until such time as the egg 127 has moved onto the scale track 67 and the baffle 89 has again come around into a position to hold up further movement of the next egg tending to roll onto the inlet end of the track means. Thus, the second cam member 102 is disposed relative to the baffle 89 and the inlet end 130 of the worm 87 so that its steep cam surface 104 will only engage the cam surface 124 of the second cam lever 112, to raise the cam lever 112 and with it the second gate member 120, after the inlet end 130 of the worm 87 has passed out of the line of the egg 126, and only after the baffle 89 has rotated to a point at which it again occupies a position preventing the egg 126 from rolling onto the scale track 67 of the scale 34. It will thus be understood that the second gate member 99 operates as a means for feeding the ovoids or other objects to be graded onto the inlet end 12 of the track means 11 at predetermined spaced intervals. Since only one egg at a time can be between the gate members 98 and 99, it is very desirable that the gate member 99, after having moved vertically to permit the egg 126 to roll thereby and onto the inlet end 12 of the track means 11, return to its barrier position, as illustrated in Fig. 4, as quickly as possible. This is accomplished by the steep cam surfaces 104 and 124 on the second cam element 102 and the second cam lever 112, respectively, which permit the second gate member to quickly resume its barrier position.

The first gate member 98 is provided as an additional safeguard for the proper operation of the second gate member 99. Without the first gate member 98, I have found that in some forms of the invention, particularly where eggs vary greatly in size, occasionally the second gate member 99 will allow two eggs at a time to pass thereby onto the inlet end 12 of the track means 11. If this occurs, it is very undesirable because sometimes the inlet end 130 of the worm 87 will hit the second egg and knock it from the inlet end 12 of the track means 11. In other cases, and with eggs more uniformly graded in size, the first gate member 98 may be dispensed with entirely, together with its associated mechanism, without impairing the operation of the device.

As noted, however, the first gate member 98 prevents the egg 125 from rolling down the feeder track 96 until the second gate member 99 has already risen and allowed the egg 126 to pass thereunder and the second gate member has returned to its barrier position, and it is only at this time that the first gate member 98 rises to allow the egg 125 to move downwardly into engagement with the second gate member 99. This lagging action of the first gate member 98 behind the action of the the second gate member 89 is provided for by the phase relationship of the first and second cam members 101 and 102, as illustrated in Figs. 8 and 9, and as pointed out hereinabove. By providing this gate means 100, I have passed hundreds of dozens of eggs of widely varying weights and sizes through my device without having any of the eggs inadvertently fall or be displaced from the track means 11 as they are being fed thereto.

As indicated above, the scale 34 will only move to its dumping position illustrated by the dotted lines 80 in Fig. 6 when a "large" egg, i. e., an egg weighing more than a predetermined minimum, passes onto the scale track 67. When this occurs, the egg overbalances the counterbalance 54, and the balance arm 46 moves in a counterclockwise direction, as seen in Fig. 6, about the main pivot point provided by the knife edge 43 of the balance member 42. Since the guide bar 70 secured to the track arms 68 is at all times guided by the guide slots 72 and 73, upon initial counterclockwise rotation of the balance arm 46 the scale track 67 will merely move downwardly while retaining its horizontal position, the balance arm 46 rotating relative thereto. This is due to the upper vertical portions 77 of the guide slots 72 and 73, which guide the track arms 68 vertically through their initial downward movement. As soon as the guide bar 70 starts to move downwardly through the central semicircular portions 78 of the guide slots 72 and 73, the slots cause the track arms 68 to rotate in a counterclockwise direction relative to the balance arm 46, and movement of the guide bar 70 rearwardly in the lower sloping portions 79 of the guide slots completes this rotation to the position indicated by the dotted lines 80 in Fig. 6, which is the dumping position. At about the time the scale track 67 reaches its dumping position, the egg resting thereon rolls by gravity onto the receiving apron 81 and from it downwardly into the first receiving compartment 28, being cushioned by the cushioning material 32 on the inner walls of the receiving compartment. As soon as the egg has been dumped from the scale track 67, the weight of the counterbalance 53 is sufficient to start the return movement of the balance arms 46 from the dumping position to their normal horizontal position, the sloping portions 79 of the slots 72 and 73 providing a cam action tending to aid the movement of the roller sleeve 71 therethrough.

If an egg weighs less than the predetermined minimum for which the scale 34 has been set, the spiral worm 87 rolls the egg off the scale track 67 onto the intermediate segment 17 and thence onto the scale track of the scale 35. If such an egg weighs more than the predetermined minimum for which the scale 35 has been initially set, the scale operates as described above with relation to the scale 34 to dump the egg into the second receiving compartment 29. As will be understood, if such egg weighs less than the predetermined minimum for which the scale 35 has been set, the spiral worm 87 continues to roll the egg along the track means 11 onto the scale 36, which either dumps the egg into the third receiving compartment 30 or allows it to be passed thereover by the worm, the egg finally being discharged from the discharge end 13 of the track means 11 onto the terminal discharge apron 21, down which the egg rolls into the fourth receiving compartment 31. Thus, as will be understood, all eggs fed to the device which weigh more than a predetermined minimum and which will grade as "large" are discharged into the first receiving compartment 28, all eggs of an intermediate size are discharged into the second receiving compartment 29, all eggs of a small size are discharged into the third receiving compartment 30, and all eggs below grade size are discharged into the fourth receiving compartment 31. Thus, my device continuously grades ovoids or spherical objects according to predetermined weight limits.

I have found that when only one worker is gathering eggs from the receiving means 24 and packing them into market crates or boxes, it is desirable to limit the rate of feed of the eggs through the device to about three dozen eggs per minute, as this is about the limit of eggs which one worker can remove from the receiving means 24 and pack with ease. I do not intend to be limited to such rate of feed, however, as it will be apparent that the rate of feed may be varied between wide limits without departing from the spirit of my invention.

Although I have described a preferred embodiment of my invention, it will be understood that certain parts and elements thereof may be replaced by other parts and elements having the same functions without departing from the spirit of my invention, and I do not desire to be limited to the specific embodiment shown, but desire to be afforded the full scope of the following claims.

I claim as my invention:

1. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm.

2. In an ovoid grading device, the combination of: track means having an inlet end and a discharge end and adapted to support and guide an ovoid therealong, said track means being sloped upwardly from said inlet end to said discharge end; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm, the slope of said track means retaining said ovoids in engagement with said worm as they are conveyed along said track means by said worm.

3. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; gate means synchronized with the rotation of said worm for feeding a sequence of ovoids onto said inlet end at spaced intervals, said synchronization being such that the end of said worm will not strike any ovoid tending to displace such ovoid laterally from said track means; and means for rotating said worm.

4. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; means for feeding a sequence of ovoids onto said inlet end at spaced intervals; stop means associated with said worm for preventing more than one ovoid from being on said scale means at any one time; and means for rotating said worm.

5. In an ovoid grading device, the combination of: track means having an inlet end and a discharge end and adapted to support and guide an ovoid therealong, said track means being sloped upwardly from said inlet end to said discharge end; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; feeder means for feeding a sequence of ovoids onto said inlet end at spaced intervals by gravity; and means for rotating said worm, the slope of said track means retaining said ovoids in engagement with said worm as they are conveyed along said track means by said worm.

6. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm rolling said ovoids along said track means perpendicular to their longitudinal axes, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm.

7. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; gate means synchronized with the rotation of said worm for feeding a sequence of ovoids onto said inlet end at spaced intervals; stop means associated with said worm for preventing more than one ovoid from being on said scale means at any one time; and means for rotating said worm.

8. In an ovoid grading device, the combination of: track means having an inlet end and a discharge end and adapted to support and guide an ovoid therealong, said track means being sloped upwardly from said inlet end to said discharge end; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; a feeder track sloped downwardly and registering at its lower end with said track means, whereby an ovoid placed on said feeder track will roll downwardly thereon by gravity onto said track means; and means for rotating said worm, the slope of said track means retaining said ovoid in engagement with said worm as said ovoid is conveyed along said track means by said worm.

9. In an ovoid grading device, the combination of: track means having an inlet end and a discharge end and adapted to support and guide an ovoid therealong, said track means being sloped upwardly from said inlet end to said discharge end; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; a feeder track sloped downwardly and registering at its lower end with said track means, whereby an ovoid placed on said feeder track will roll downwardly thereon by gravity onto said track means; gate means in the line of said feeder track and adapted to feed ovoids from said feeder track to said track means at spaced intervals; and means for rotating said worm, the slope of said track means retaining said ovoids in engagement with said worm as they are conveyed along said track means by said worm.

10. In an ovoid grading device, the combination of: track means having an inlet end and a discharge end and adapted to support and guide an ovoid therealong; scale means in the line of said track means, said scale means including a scale track, said scale track being movable in response to an ovoid of predetermined weight thereon from a normal position in which it is aligned and registering with said track means to a dumping position in which it dumps said ovoid therefrom, said scale track automatically returning to said normal position subsequent to the dumping of said ovoid therefrom; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm.

11. In an ovoid grading device, the combination of: track means having an inlet end and a discharge end and adapted to support and guide an ovoid therealong; scale means in the line of said track means, said scale means including a scale track, said scale track being movable in response to an ovoid of predetermined weight thereon from a normal position in which it is aligned and registering with said track means to a dumping position in which it dumps said ovoid therefrom, said scale track automatically returning to said normal position subsequent to the dumping of said ovoid therefrom; a receiver positioned to catch ovoids dumped by said scale means, said receiver registering with and being sloped downwardly from said scale means to permit ovoids dumbed onto said receiver to roll downwardly thereon away from said scale means; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longituidnal axis of said ovoid; means for feeding a sequence of ovoids onto said inlet end at spaced intervals; and means for rotating said worm.

12. In an ovoid grading device, the combination of: track means having an inlet end and a discharge end and adapted to support and guide an ovoid therealong; scale means in the line of said track means, said scale means including a scale track, said scale track being movable in response to an ovoid of predetermined weight thereon from a normal position in which it is aligned and registering with said track means to a dumping position in which it dumps said ovoid therefrom, said scale track automatically returning to said normal position subsequent to the dumping of said ovoid therefrom; a receiver positioned to catch ovoids dumped by said scale means, said receiver registering with and being sloped downwardly from said scale means to permit ovoids dumped onto said receiver to roll downwardly thereon away from said scale means; cushion means on said receiver for preventing breakage of ovoids moving thereon; a rotatable worm positioned above said track means and parallel thereto and adapted to convey an ovoid along said track means from said inlet end toward said discharge end and over said scale means, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm.

13. In an ovoid grading device, the combination of: track means having an inlet end and a discharge end and adapted to support and guide an ovoid therealong; first scale means in the line of said track means adjacent said inlet end and adapted to remove from said track means any ovoid weighing more than a first predetermined amount; second scale means in the line of said track means between said first scale means and said discharge end and adapted to remove from said track means any ovoid weighing more than a second predetermined amount less than said first predetermined amount; third scale means in the line of said track means between said second scale means and said discharge end and adapted to remove from said track means any ovoid weighing more than a third predetermined amount less than said second predetermined amount; a rotatable worm positioned above said track means and parallel thereto and adapted to convey an ovoid along said track means from said inlet end toward said discharge end and over said first, second, and third scale means in sequence, said worm having a diameter substantially greater than the diameter of said ovoids so as to present an ovoid-engaging face adapted to engage an ovoid on said track means at a relatively low angle from the longitudinal axis of said ovoid; means for feeding a sequence of ovoids onto said inlet end at spaced intervals; and means for rotating said worm.

14. In an egg-weighing device, the combination of: an arm pivoted on a main pivot point; an egg receiving track pivoted on a track pivot to said arm on one side of said main pivot point; a counterbalance on said arm on the other side of said main pivot point; and guide means for controlling rotation of said track about said track pivot in response to rotation of said arm about said main pivot point, said guide means preventing rotation of said track about said track pivot during an initial rotational movement of said arm but rotating said track about said track pivot in response to a subsequent rotational movement of said arm about said main pivot point.

15. In an egg-weighing device, the combination of: an arm pivoted on a main pivot point; an egg receiving track pivoted on a track pivot to said arm on one side of said main pivot point, said receiving track being disposed eccentric to said track pivot, thereby tending to cause said track to rotate about said track pivot in a predetermined direction; a counterbalance on said arm on the other side of said main pivot point; and guide means for permitting rotation of said track about said track pivot only in response to rotation of said arm about said main pivot and for causing controlled rotation of said track about said track pivot in response to said rotation of said arm.

16. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; means for feeding a sequence of ovoids onto said inlet end at spaced intervals; stop means associated with said worm for preventing more than one ovoid from being on said scale means at any one time, said stop means including a baffle member having a portion adapted to intermittently block the passage of an ovoid along said track means and so operating in response to rotation of said worm; and means for rotating said worm.

17. In an ovoid grading device, the combination of: track means having an inlet end and a discharge end adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; means for feeding a sequence of ovoids onto said inlet end at spaced intervals; stop means associated with said worm for preventing more than one ovoid from being on said scale means at any one time, said stop means including an arcuate baffle secured to said worm and adapted to block the passage of an ovoid along said track means, said baffle being so disposed relative to said worm that the open end of said baffle is adapted to clear an ovoid on said track means only after said worm has moved to a position adapted to move an ovoid off said scale means; and means for rotating said worm.

18. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; gate means synchronized with the rotation of said worm for feeding a sequence of ovoids onto said inlet end at spaced intervals, said gate means including a gate member adapted to block the passage of an ovoid onto said inlet end until the end of said worm has rotated past the line of said track means, said gate member thereafter rising to allow such ovoid to pass onto said inlet end of said track means; and means for rotating said worm.

19. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; gate means synchronized with the rotation of said worm for feeding a sequence of ovoids onto said inlet end at spaced intervals, said gate means including a gate member adapted to feed ovoids to the inlet end of said track means so that the end of said worm will not strike any ovoid tending to displace such ovoid laterally from said track means, and including a gate element adapted to feed only one ovoid at a time to said gate member; and means for rotating said worm.

20. In an ovoid grading device, the combination of: track means having an inlet end and a discharge end and adapted to support and guide an ovoid therealong; scale means in the line of said track means and adapted to remove from said track means any ovoid weighing more than a predetermined amount; a rotatable worm positioned above said track means and parallel thereto and adapted to convey an ovoid along said track means from said inlet end toward said discharge end and over said scale means; gate means synchronized with the rotation of said worm for feeding a sequence of ovoids onto said inlet end at spaced intervals, said gate means including a gate member adapted to block the passage of an ovoid onto said inlet end until the end of said worm has rotated past the line of said track means, said gate member thereafter moving to allow such ovoid to pass onto said inlet end of said track means; and means for rotating said worm.

JOSHUA A. HILL.

REFERENCES CITED

The following references are of record in the file of this patent:

UNITED STATES PATENTS

| Number | Name | Date |
|---|---|---|
| 550,379 | McIntyre | Nov. 26, 1895 |
| 1,694,675 | White | Dec. 11, 1928 |
| 1,728,463 | Wyland | Sept. 17, 1929 |
| 2,020,511 | McHenry | Nov. 12, 1935 |
| 2,235,877 | Guggenheim | Mar. 25, 1941 |
| 2,279,947 | Keen | Apr. 14, 1942 |

FOREIGN PATENTS

| Number | Country | Date |
|---|---|---|
| 245,022 | Germany | Mar. 25, 1912 |
| 335,951 | Great Britain | Oct. 6, 1930 |